Figure 3:
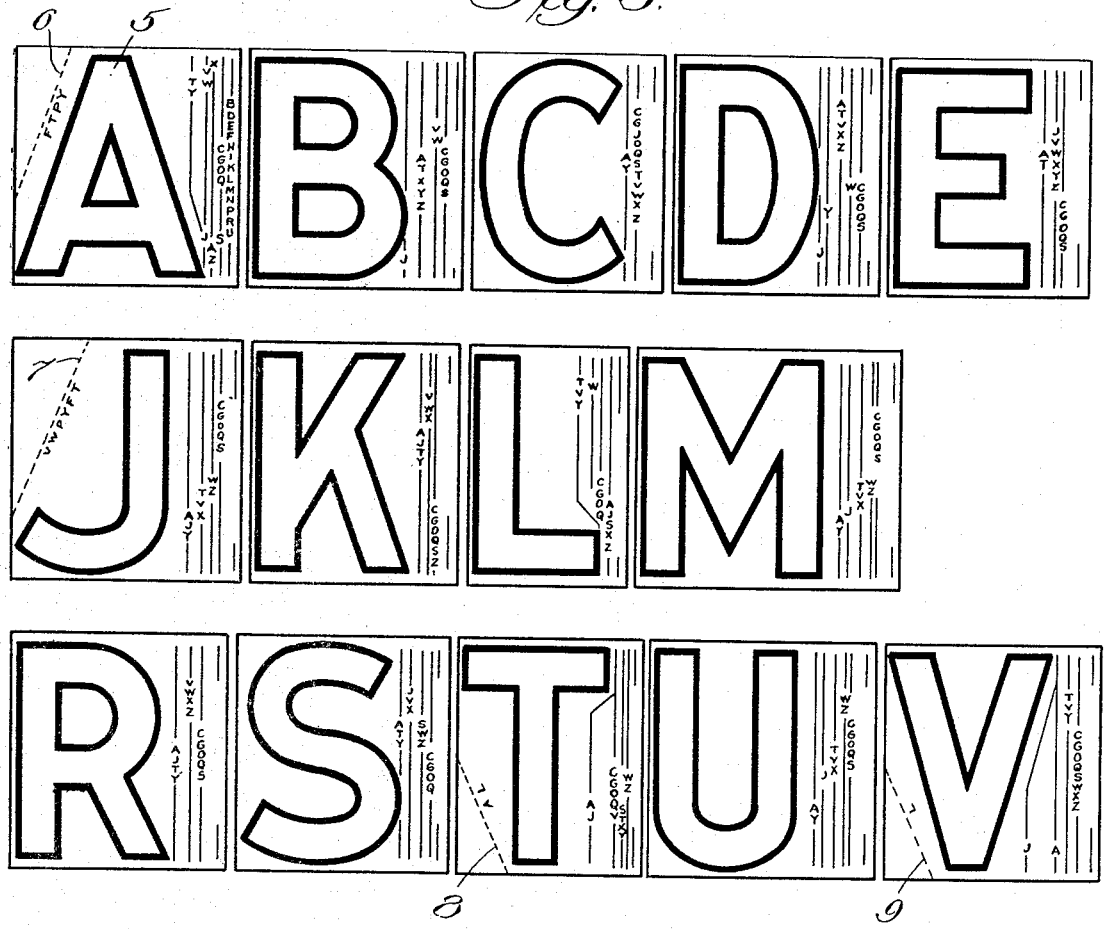

Aug. 10, 1937.   J. E. ADAIR   2,089,779
DECALCOMANIA ADAPTED FOR COMPOSING WORDS
Filed Oct. 16, 1936   2 Sheets—Sheet 1
Inventor:
J. E. Adair,
by Wm. F. Freudenreich, atty.

Aug. 10, 1937.  J. E. ADAIR  2,089,779

DECALCOMANIA ADAPTED FOR COMPOSING WORDS

Filed Oct. 16, 1936   2 Sheets—Sheet 2

Inventor:
J. E. Adair,
by Wm. F. Freudenreich, Atty.

Patented Aug. 10, 1937

2,089,779

UNITED STATES PATENT OFFICE 2,089,779

DECALCOMANIA ADAPTED FOR COMPOSING WORDS

James Eugene Adair, Chicago, Ill., assignor to Meyercord Company, a corporation of Illinois Application October 16, 1936, Serial No. 105,872

5 Claims. (Cl. 41—33)

Decalcomanias are made in large quantities in the form of individual letters of alphabets of different styles and configurations. Often, these individual letters are employed in the composition of names or other words. In order that such a composition shall present a neat and artistic whole, it is necessary that the spacings between the letters be properly chosen. The ordinary individual has no definite perception of the factors involved in the determination of the spacings that should exist between various letters. Furthermore, since the spacing between any given letter and a second letter may vary whenever another letter is substituted for either, it is not possible, in the manufacture of the decalcomanias, to cut them up in such predetermined sizes that an effective composition may be made by simply placing the decalcomanias side by side with their edges touching. The result is that individuals making compositions of individual letters very seldom obtain satisfactory results.

The object of the present invention is to make it possible for anyone to compose a word of any kind by employing decalcomanias in the form of individual letters, with the assurance that the letters in the completed composition may be appropriately spaced apart from each other.

In carrying out my invention I placed on the back of each decalcomania markings to indicate a line or lines on which the same is to be trimmed when placed in front of any other letter of the alphabet or, in some instances, behind another letter. These markings are arbitrary in the sense that the ordinary person does not possess sufficient knowledge to do the trimming properly, although such markings may be the result of the accumulated experience in the arts of printing and sign making.

Therefore, viewed in one of its aspects, the present invention may be said to have for its object to provide a decalcomania, the subject of which is a letter of an alphabet, with means to enable anyone accurately to trim the same to provide the proper spacing between that letter and any other letter of the alphabet forming the subject of a similar decalcomania placed edge to edge with the one that has been trimmed.

Figure 4:
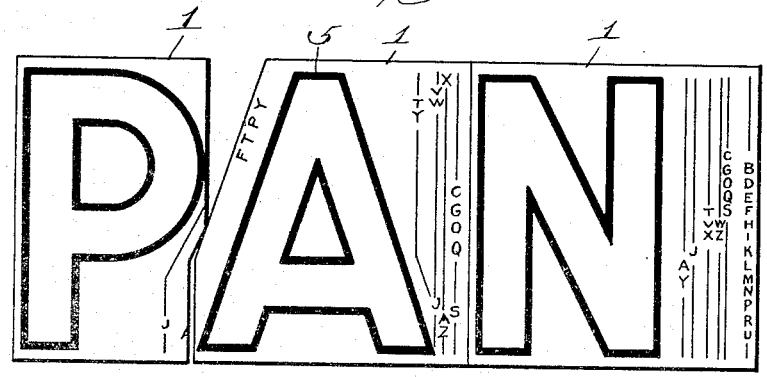

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a front view of an ordinary decalcomania in which the subject is printed face up, parts of the ink film and the gum coating on the paper backing being broken away; Figs. 2 and 3 are rear views of a series of decalcomanias, like that in Fig. 1, comprising the letters of an alphabet, except the letter N, untrimmed; and Fig. 4 is a rear view of three of the decalcomanias assembled to produce a word, the two lefthand decalcomanias being shown in a trimmed condition and the righthand decalcomania, the subject of which is the letter N, being untrimmed.

The decalcomanias may take any usual or suitable form each comprising, generally speaking, a backing 1 of paper or other suitable material provided with a soluble gum coating 2 upon which the ink film 3 is carried. The subject, which in the present instance is a letter of an alphabet, may be printed either face up or face down, de-depending upon the use to which the decalcomanias are to be put. In the arrangement shown in Fig. 1, the subject 4, which is the letter A, is printed face up. On the rear face of the backing there is printed an identifying letter 5 which is the same as that forming the subject of the transferable film.

The individual decalcomanias are of rectangular shapes, the height being the same in all cases, but the widths differing according to the widths of the letters. The letters are all placed close to the lefthand edges of the backings as viewed from the rear, because in most cases trimming need be done only at the righthand side. In some cases, namely those decalcomanias carrying the letters A, J, T, V, W and Y, respectively, either the upper lefthand corner or the lower lefthand corner should be cut away when one of these letters is to follow any one of certain other letters. Therefore, in the case of the decalcomanias corresponding to the letters A, J, T, V, W and Y, lines 6, 7, 8, 9, 10 and 11, respectively, are printed more or less diagonally across the proper lefthand corners of the backings; each line having placed beside the same the letters which require cutting of the decalcomanias along that line when that decalcomania is to follow a decalcomania bearing any one of these latter letters.

Arranged on the righthand side of the backing of each decalcomania are a series of vertical lines the majority of which are straight. Associated with each of these lines are the letters of the alphabet which require that the decalcomania bearing it be trimmed along that particular line when it is to be followed by any one of such letters. Thus, in the case of the letter A, there are four vertical lines and a fifth line which is an irregular one.

When we examine the back of the decalcomania bearing the letter A, we therefore find that when the letter A is to be preceded by either of the letters F, T, P and Y, the upper lefthand corner must be trimmed along the line 6 on the back of the A decalcomania. If the letter A is to be followed by any one of the letters B, D, E, F, H, I, K, L, M, N, P, R, or U, the A decalcomania must be trimmed at the righthand side along the vertical line nearest the right edge. If either of the letters C, G, O, Q or S is to follow the letter A, the trimming must be done along the second line from the righthand edge. So, if the letter X, A or Z is to follow the letter A, the trimming must be done along the third line. If the letter A is to be followed by the letter V, W, or J, the trimming must be done along the fourth line from the righthand edge. If either the letter T or the letter Y is to follow the letter A, the trimming must be done along the innermost or fifth line, the upper part of which is vertical and the lower part of which extends laterally and downwardly until it joins the fourth of the lines.

It so happens that each of the decalcomanias must be trimmed along the first line from the righthand edge when followed by any one of the same group of letters. Therefore, while the entire thirteen letters of this group appear in association with this particular line in the case of the letter A, I have not reproduced them in connection with the other decalcomanias. It will be noted that in some instances the cutting lines on the righthand side number as many as six and, in at least one instance, the C decalcomania, only three.

The decalcomanias are transferred in the usual way after having been trimmed. Afterward, all of the decalcomanias that go to make up a line of the composition may be adhered to the surface which is to carry the composition, before any of the backings are removed or, if desired, the backing of each decalcomania may be removed immediately after that particular unit has been attached to the supporting surface.

In Fig. 4 I have illustrated a way in which the word PAN may be applied to a support. Since the letter P is followed by the letter A, the P decalcomania has been trimmed on the righthand side along the line marked with the letter A, as shown in Fig. 2. Since the letter A is preceded by the letter P, the A decalcomania has been trimmed along the diagonal line 6 of Fig. 3. Since the letter A is followed by the letter N, the A decalcomania has been trimmed along the vertical line farthest to the right in Fig. 3. Since nothing follows the letter N, there was no need to trim the N decalcomania. The three decalcomanias may be affixed to the surface which is to carry the composition, in any usual way, with their corresponding horizontal edges in alignment and with their side edges in contact with each other. Then, upon wetting the backs so as to dissolve the gum coatings, the backs may be peeled off, exposing the ink films.

It will thus be seen that I have made it possible for anyone to purchase decalcomanias bearing the individual letters required to make up a name or other composition of letters, and be enabled to transfer such letters in such a way that they will not only be accurately aligned but will be correctly spaced apart from each other. Therefore, when only a few, or perhaps a single specimen of the composition are needed, the same effect can be obtained as though the entire composition were made up as a single decalcomania at a cost enormously greater than that of individual, stock letters. As heretofore explained, the decalcomanias themselves are old and in common use, so that the manner of making the actual transfers is not a part of the present invention which has to do only with the means for assuring proper spacings when the letters are transferred.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A decalcomania the transferable subject of which is a letter of an alphabet, there being on the same lines along which the decalcomania is to be trimmed when the letter is to be placed beside any other letter of the same alphabet in a composition, and each line having associated therewith a character or characters indicating the letter or letters requiring that the decalcomania be trimmed along that line.

2. A decalcomania comprising a backing member and a transfer film secured to said member by a soluble adhesive, the subject of the said film being a letter of an alphabet and being substantially narrower than the width of the backing, and there being on the exposed face of the backing lines along which the decalcomania is to be trimmed before the subject is transferred in the making of a composition, each of said lines having associated therewith a character or characters indicating the letter or letters which, if immediately following the letter of said decalcomania, require that the trimming be done along that line to secure the proper spacing between the two letters.

3. A set of decalcomanias comprising individual letters of an alphabet, each decalcomania being substantially wider than the overall width of the letter forming the subject thereof, there being marked on the back of each decalcomania a series of lines, each of such lines representing the proper trim to be given to the decalcomania when it is to be placed in juxta-position to a given letter in a composition, and there being a character or characters associated with each of said lines to indicate the letter or letters which, when adjacent, require the trimming to be done on that line.

4. A decalcomania the transferable subject of which is a letter of an alphabet, there being on the same, on one side of the letter, several different lines along which the decalcomania is to be trimmed when the letter is placed beside any other letter of the same alphabet in a composition, each line having associated therewith a character or characters indicating the letter or letters requiring that the decalcomania be trimmed along that line.

5. A decalcomania the transferable subject of which is a letter of an alphabet, there being on the same, on one side of the letter, several different lines along which the decalcomania is to be trimmed when the letter is placed beside any other letter of the same alphabet in a composition, the letters of the alphabet being distributed in association with said lines to indicate the line along which the decalcomania must be trimmed when it is to be followed by any other letter of the alphabet.

JAMES E. ADAIR.